Aug. 2, 1932.    A. RANDOLPH ET AL    1,869,776
AUTOMATIC OILING SYSTEM
Original Filed July 29, 1929    2 Sheets-Sheet 1

Inventors
Alfred Randolph,
and Edwin S. Dawson
By Bates, Golnek & Teare  Attorneys.

Aug. 2, 1932.  A. RANDOLPH ET AL  1,869,776
AUTOMATIC OILING SYSTEM
Original Filed July 29, 1929  2 Sheets-Sheet 2

Inventors
Alfred Randolph
and Edwin S. Dawson
By Bates, Golrick & Fear, Attorneys Patented Aug. 2, 1932

1,869,776

UNITED STATES PATENT OFFICE

ALFRED RANDOLPH AND EDWIN S. DAWSON, OF SALEM, OHIO, ASSIGNORS TO THE DEMING COMPANY, OF SALEM, OHIO, A CORPORATION OF OHIO

AUTOMATIC OILING SYSTEM

Original application filed July 29, 1929, Serial No. 381,708. Divided and this application filed May 29, 1930. Serial No. 456,884.

Our copending application No. 381,708, filed July 29th, 1929, of which this is a division, shows an automatic oiling system suitable for power heads of deep well pumps. This system, by a rotary gear pump of peculiar character, carries the oil to a region near the top of the machine where it is discharged into a reservoir from which it is fed by gravity to suitable points. Our parent application is concerned with the oil pump and the forcing of the oil by pressure by and at the pump. The present invention on the other hand relates to the distribution of the oil to the connecting rod and cross head. Simplicity of construction and certainty of operation are features of our method of distribution, and the arrangements by which we effect this will become apparent from the following description taken in connection with the drawings, which show a preferred form of construction.

Figure 1:
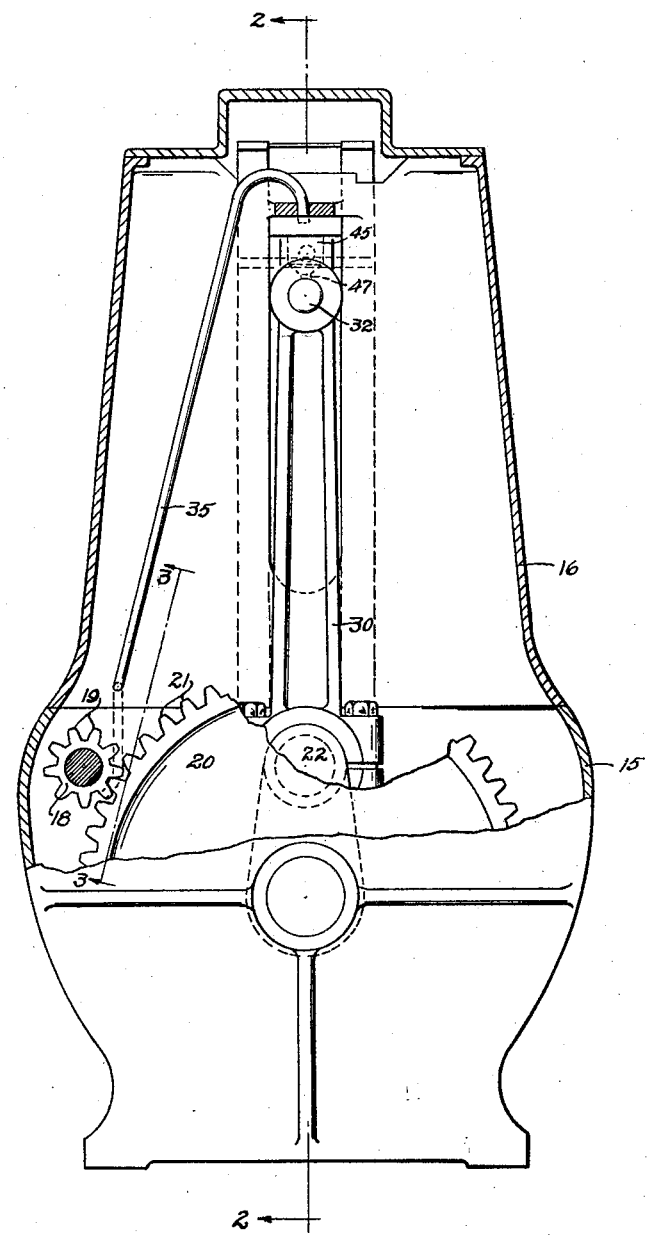
Figure 3:
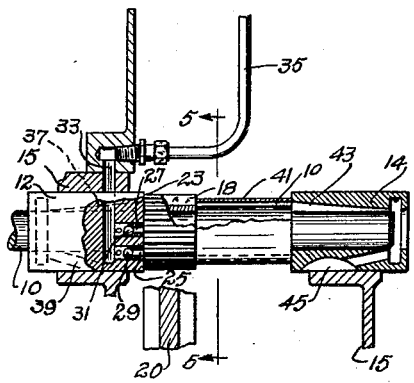
Figure 4:
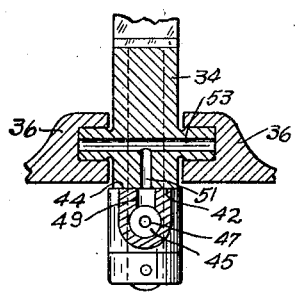
Figure 5:
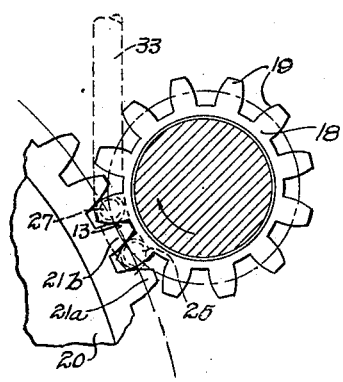
Figure 2:
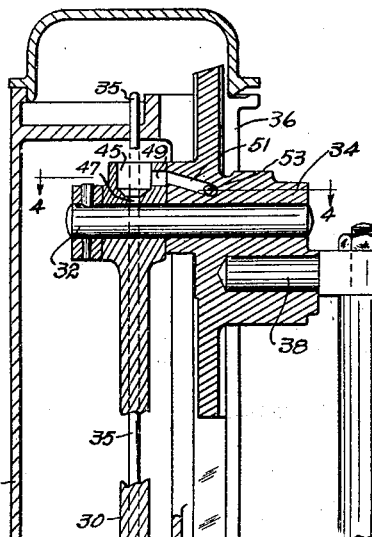
Figure 2:
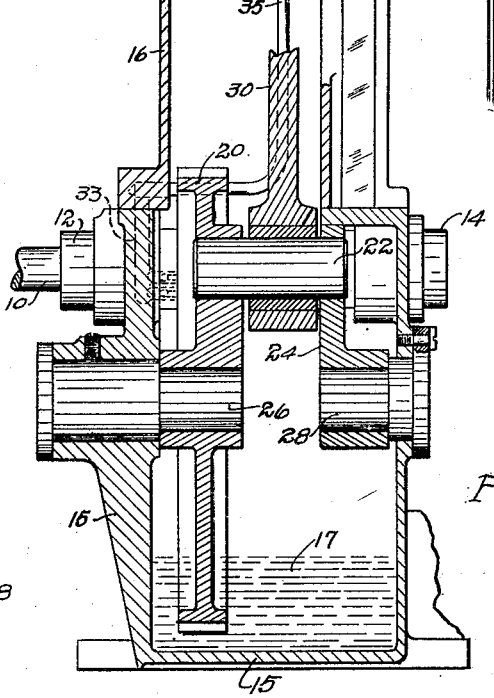

In the drawings, Fig. 1 is an end view partially in cross-section showing our oiling system as applied to a power pump working head; Fig. 2 is a cross sectional elevation taken substantially along the line 2—2 of Fig. 1; Fig. 3 is a cross sectional detail taken along the line 3—3 of Fig. 1; Fig. 4 is a cross sectional detail taken along the line 4—4 of Fig. 2; and Fig. 5 is an enlarged cross section taken along the line 5—5 of Fig. 3.

We will first describe the characteristics of the power working head, to which our lubricating distribution is applied; then the means for distributing the oil under pressure to the connecting rod and cross head, which constitutes the subject matter of this application, and will then describe briefly the particular oil pump shown, which is claimed in our parent application.

In Figs. 1 and 2 of the drawings, we show our preferred form of working head, a brief description of which follows: The reference numeral 10 indicates a drive shaft mounted in bearings 12 and 14 carried by the sump member 15 of the casing 16. The shaft 10 carries a pinion 18 rigidly mounted thereon and meshing with a crank gear 20.

The crank pin 22 is supported by the gear 20 and a crank throw 24 which are mounted on stud bearings 26 and 28 respectively, extending through suitable openings formed in the sump member 15. A connecting rod 30 is operated by the crank pin 22 and at its upper end, the connecting rod is provided with a wrist pin 32 which extends through and is rigidly mounted in a suitable opening in the cross head 34. The cross head is mounted on guides 36 carried by the casing 16 and is provided with a pin 38 to which the pump rod 40 may be secured in any suitable manner.

The oil 17 in the sump member 15, in the form shown, is carried up by the gear 20 and forced by the pinion 18 coacting therewith in the manner hereinafter described, into the pipe 35 which carries it to a region near the top of the power head where it is discharged into a reservoir 47 in the upper end of the connecting rod. As the cross head 34 and the connecting rod reciprocate the cup 45 will be filled by oil flowing from the tube 35. A duct 47 leads from the cup to the surface of the wrist pin 32. As shown in Fig. 4, an oil duct 49 leads from the cup to the plane surface 42 of the connecting rod, which contacts with another plane surface 44 on the cross head. The duct 51 in the cross head has an opening adjacent the opening of the duct 49. These openings are large enough to allow oil to flow from the duct 49 into the duct 51 at the greatest angular displacement of the connecting rod. At right angles to the duct 51 there is an oil passage 53 which serves to convey oil to the cross head guides 36. Any excess amount of oil may drip back into the sump and be recirculated.

When the device is in operation the rotation of the gear 20 carries oil from the sump 15 up to the point where the gear meshes with the pinion 18. Some of the oil is forced through the openings 25 or 27 and into the tube 35 which conveys it to the upper part of the machine. From the tube 35 it flows into the oil cup 45 which supplies oil to the wrist pin bearings and cross head guides. Any overflow from the cup 45 flows down the connecting rod 30 and assists in lubricating the crank pin 22; and excess oil supplied to any of the bearings may flow back into the sump so that the cycle of operation will be continuous.

We will now describe the pump shown particularly in Figs. 3 and 5, which we have found to be satisfactory means for forcing the oil up the pipe 35.

As the teeth of the driven gear 20 lift from the sump more oil than there is room for, when the pinion teeth and gear teeth mesh, some of the oil will be forced laterally from between such meshing teeth. A part of the oil may escape in a direction opposite to the direction of rotation of the gears, but not all, because as each pinion tooth comes into contact with the corresponding gear teeth, escape in that direction is cut off and substantially all of the remainder of the oil will be forced under pressure from between the contacting teeth in a direction parallel with the teeth faces, that is, in a direction parallel with the axes of the gears.

In the end of the bearing 12 which abuts a face of the pinion 18 as at 23, we have provided openings 25 and 27 which lie in the line of contact of the gear teeth, as shown in Fig. 5, and which may receive oil forced from between the teeth. Ball check valves 29 and 31 may be placed in the ducts leading to these openings, which communicate with the duct 33 which may be partly within the bearing and partly within the casing 15, and to which the tube 35 is connected.

A tapered oil groove 37 in the bearing 12 opens adjacent the pinion and admits oil to the bearing. A suitable overflow passage 39 is provided which permits excess oil to flow back into the sump. In order to lubricate the bearing 14 a sleeve 41 may be loosely mounted on the shaft 10, extending from the pinion 18 to the bearing 14. Some of the oil forced from between the gear teeth will be carried along the inside of the sleeve to the tapered oil groove 43 and the excess may flow back to the sump through the passage 45.

Satisfactory operation of our oil pump regardless of the direction of rotation of the gears is effected by providing two openings adjacent the faces of the gears, one on each side of the point of tangency 13 of the pitch circles of the gears. As shown in Fig. 5, where two of the teeth 19 of the pinion 18 are broken away, the opening 25 is below the point of tangency and the opening 27 is above. Assuming that the gears are rotating in the direction shown by the arrow on the pinion, the teeth will be coming together below the point of tangency and the oil between teeth 21a and 21b will be forced into the opening 25. At the same time the teeth above the point of tangency will be moving apart and the check valve 31 (see Fig. 3) will prevent oil from flowing back through the opening 22 into the space between teeth 21b and 21a. When the gears are rotating in the opposite direction the operations will be reversed, oil will be forced into opening 27, and the valve 29 will prevent oil from flowing back through opening 25.

Describing the operation of the entire machine shown in the drawings, the rotation of the gear 20 carries oil from the sump 15 up to the point where the gear meshes with the pinion 18. Then the excess oil is forced from the gear, and that part of the excess which flows out in a direction parallel to the teeth faces is distributed to other parts of the machine which require lubrication. A portion of the oil flows into the groove 37 and lubricates the bearing 12. Another portion flows inside the sleeve 41 to lubricate the bearing 14. Some of the oil is forced through the openings 25 or 27 and into the tube 35 which conveys it to the upper part of the machine. From the tube 35 it flows into the oil cup 45 which supplies oil to the wrist pin bearings and cross head guides. Any overflow from the cup 45 flows down the connecting rod 30 and assists in lubricating the crank pin 22; and excess oil supplied to any of the bearings may flow back into the sump, so that the cycle of operation will be continuous.

We claim:

1. In an oiling system for a power head having a connecting rod and a cross head, which have mutual rubbing surfaces and a cross head guide, the combination of an oil cup on the connecting rod, a passageway through said rubbing surfaces for distributing oil from the oil cup to the cross head guide.

2. The combination of a connecting rod, a cross head, a rigid cross head pin, and a pair of cross head guides, the connecting rod having a head which embraces the cross head pin and oscillates thereon and which has a flat side bearing against a flat face on the cross head, an oil cup in the connecting rod head, a duct for distributing oil from the oil cup to the cross head pin, a duct from the oil cup through the side of the connecting rod head, and a communicating duct in the cross head leading laterally in two directions to the cross head guides.

3. A lubricator for a cross head which is adapted to move in guides and which has a connecting rod associated therewith, comprising an oil cup mounted on the connecting rod, a duct leading downwardly from the oil cup and into the cross head, and a channel within the cross head communicating with the duct, said channel extending through the cross head from one bearing surface thereof to the other bearing surface, for conducting oil from the duct to the bearing surfaces of the cross head.

4. In an oiling system, two machine parts having mutual rubbing surfaces, one part having an oscillating movement with reference to the other part, an oil reservoir in one part, a duct leading from the reservoir to the rubbing surface, a duct in the other part for conducting the oil to desired points, said second duct ending in the mutual rubbing surface adjacent the first duct, whereby a flow of oil from one part to the other is possible at all stages of the oscillating movement.

In testimony whereof, we hereunto affix our signatures.

ALFRED RANDOLPH.
EDWIN S. DAWSON.